United States Patent
Di Stefano et al.

(10) Patent No.: US 12,145,565 B2
(45) Date of Patent: Nov. 19, 2024

(54) BRAKE BY WIRE BRAKING SYSTEM FOR VEHICLES, PROVIDED WITH ELECTRIC ACTUATION AND ELECTRIC BACK-UP

(71) Applicant: FRENI BREMBO S.P.A., Curno (IT)

(72) Inventors: Massimo Di Stefano, Curno (IT); Samuele Mazzoleni, Curno (IT); Luca Cappelletti, Curno (IT)

(73) Assignee: Brembo S.p.A., Bergamo (IT)

(*) Notice: Subject to any disclaimer, the term of this patent is extended or adjusted under 35 U.S.C. 154(b) by 549 days.

(21) Appl. No.: 16/647,725

(22) PCT Filed: Sep. 10, 2018

(86) PCT No.: PCT/IB2018/056863
§ 371 (c)(1),
(2) Date: Mar. 16, 2020

(87) PCT Pub. No.: WO2019/058204
PCT Pub. Date: Mar. 28, 2019

(65) Prior Publication Data
US 2020/0254988 A1  Aug. 13, 2020

(30) Foreign Application Priority Data
Sep. 21, 2017  (IT) .................. 102017000105896

(51) Int. Cl.
*B60T 8/92* (2006.01)
*B60T 8/17* (2006.01)
(Continued)

(52) U.S. Cl.
CPC .............. *B60T 8/92* (2013.01); *B60T 8/17* (2013.01); *B60T 8/3255* (2013.01); *B60T 8/36* (2013.01);
(Continued)

(58) Field of Classification Search
CPC ...... B60T 13/662; B60T 13/741; B60T 13/74; B60T 2270/402; B60T 2270/413;
(Continued)

(56) References Cited

U.S. PATENT DOCUMENTS 4,701,854 A  10/1987 Matsuda
7,620,465 B2  11/2009 Degoul et al.
(Continued)

FOREIGN PATENT DOCUMENTS

CN  103448559 A  12/2013
EP  0152101 A2  8/1985
(Continued)

OTHER PUBLICATIONS

European Patent Office, International Search Report with Written Opinion, issued in PCT/IB2018/056863, dated Nov. 20, 2018, 11 pages, European Patent Office, Rijswijk, Netherlands.
(Continued)

*Primary Examiner* — Bradley T King
*Assistant Examiner* — James K Hsiao
(74) *Attorney, Agent, or Firm* — Marshall & Melhorn, LLC (57) ABSTRACT

A braking system for vehicles may have a control unit for two brake groups operatively connected to electromechanical actuators for each brake group through a relative piloting device. Each control unit may be powered by a power source and being galvanically isolated from other power sources. Each control unit may be programmed to implement, via a piloting device, a standard braking strategy in case of detection of a standard operation of each brake group and a fault braking strategy, if it detects an electrical fault of one or more of the brake groups.

12 Claims, 4 Drawing Sheets

(51) Int. Cl.
*B60T 8/32* (2006.01)
*B60T 8/36* (2006.01)
*B60T 13/66* (2006.01)
*B60T 17/22* (2006.01)
*B62D 6/00* (2006.01)
*B60T 7/04* (2006.01)
*B60T 7/08* (2006.01)

(52) U.S. Cl.
CPC .......... *B60T 13/662* (2013.01); *B60T 17/221* (2013.01); *B62D 6/00* (2013.01); *B60T 7/042* (2013.01); *B60T 7/085* (2013.01); *B60T 2260/02* (2013.01); *B60T 2270/30* (2013.01); *B60T 2270/402* (2013.01); *B60T 2270/404* (2013.01); *B60T 2270/60* (2013.01); *B60T 2270/82* (2013.01)

(58) Field of Classification Search
CPC ........ B60T 17/221; B60T 17/22; B60T 8/885; B60T 8/92; B60T 8/17; B60T 8/3255; B60T 8/36; B60T 7/042; B60T 7/085; B60T 2260/02; B60T 2260/30; B60T 2260/404; B60T 2260/60; B60T 2260/82; B62D 6/00
See application file for complete search history.

(56) References Cited

U.S. PATENT DOCUMENTS

| 7,739,014 | B2 | 6/2010 | Lu et al. | |
|---|---|---|---|---|
| 10,407,033 | B2 | 9/2019 | Kotera et al. | |
| 2002/0167218 | A1* | 11/2002 | Chubb | B60T 1/14 303/5 |
| 2004/0150365 | A1* | 8/2004 | Ochiai | B60L 15/007 903/906 |
| 2005/0057095 | A1* | 3/2005 | Hac | B60T 8/885 303/122 |
| 2006/0184306 | A1* | 8/2006 | Kolberg | B60T 8/1703 303/20 |
| 2006/0212135 | A1* | 9/2006 | Degoul | G05B 9/03 700/20 |
| 2007/0228824 | A1* | 10/2007 | Yasukawa | F16D 65/18 303/171 |
| 2008/0086251 | A1 | 4/2008 | Lu et al. | |
| 2008/0296106 | A1* | 12/2008 | Nilsson | B60T 8/345 701/115 |
| 2010/0198473 | A1* | 8/2010 | Strengert | B60T 17/221 701/70 |
| 2010/0204894 | A1* | 8/2010 | Strengert | B60T 17/221 701/70 |
| 2012/0150362 | A1* | 6/2012 | Kolbe | B60T 13/74 701/2 |
| 2017/0210361 | A1* | 7/2017 | Kotera | F16D 65/183 |
| 2017/0240148 | A1* | 8/2017 | Kotera | B60T 13/741 |
| 2018/0056965 | A1* | 3/2018 | Houtman | B60T 17/22 |
| 2020/0023820 | A1* | 1/2020 | Van Thiel | B60T 7/042 |

FOREIGN PATENT DOCUMENTS

| EP | 1695886 A1 | 8/2006 |
|---|---|---|
| JP | 2013212814 A | 10/2013 |
| JP | 2017013669 A | 1/2017 |

OTHER PUBLICATIONS

The State Intellectual Property Office of People's Republic of China, Office Action in Application No. CN201880061304.5, dated Nov. 17, 2021. 15 pages.

Japan Patent Office, Office Action in Application No. JP2020516426, 2 pages.

* cited by examiner

BRAKE BY WIRE BRAKING SYSTEM FOR VEHICLES, PROVIDED WITH ELECTRIC ACTUATION AND ELECTRIC BACK-UP

FIELD OF APPLICATION

The present invention relates to a brake by wire braking system for vehicles, provided with both electric actuation and with electric back-up.

PRIOR ART

The present invention relates to the field of brake by wire braking systems for vehicles.

In known brake by wire systems, the actuation of the braking devices does not take place by direct action of the driver, but the user's request for braking action, typically acting on a lever or pedal, is converted into drive by electromechanical means which act on the braking devices, such as for example disc brake calipers.

Autonomous braking systems are also known in which the steering system of the vehicle decides the timing and the amount of braking and consequently actuates said electromechanical means connected to the braking devices.

For obvious safety reasons, braking systems must provide a back-up strategy to be implemented in the event of an electrical fault of at least one device.

In this regard, brake-by-wire braking systems are known, for example, in which, in the event of an electrical fault, the braking action is exerted mechanically, conventionally, i.e. by fluidly connecting the lever or pedal operated by the user to request the braking action, directly with said braking devices.

However, these systems have the drawback of requiring both the electrical system to be always operated under standard operating conditions, and the hydraulic system to be operated in the event of an electrical fault. The presence of the hydraulic system involves an increase in costs, masses, the management of highly hygroscopic hydraulic fluid, the management and maintenance of hydraulic fluid seals and so on.

In addition, hydraulic back-up solutions are not applicable to self-driving vehicles and do not always guarantee maximum braking efficiency in the event of hydraulic back-up.

There are also full-electric solutions that do without the hydraulic part of the braking system and that, in the event of an electrical fault, put in place back-up strategies to ensure a partial restoration of the braking capacity and therefore the performance of the braking itself, although non-optimal. However, these solutions are not optimal and, in the event of a fault, do not always guarantee optimal braking.

DISCLOSURE OF THE INVENTION

The need to solve the drawbacks and limitations mentioned with reference to the prior art is therefore increasingly felt.

This requirement is met by a braking system for vehicles according to claim 1.

In particular, this need is met by a braking system for vehicles comprising
a right front brake group and a left front brake group intended for the front axle of a vehicle, right rear brake group and a left rear brake group intended for a rear axle of a vehicle,
each brake group comprising a brake disc, a braking device associated with said brake disc, electro-hydraulic or electromechanical actuator means of each braking device,
a control unit for each brake group, operatively connected to the electromechanical of electro-hydraulic actuators of each brake group through a relative control device,
each control unit being powered by an independent power source and being galvanically isolated from the other power sources,
each control unit being programmed to implement, via said piloting device, a standard braking strategy in case of a standard operation for each brake group and a fault braking strategy, if it detects an electrical fault of one or more of the brake groups.

According to one embodiment, each control device is programmed so as to be able to switch from a standard mode to a degraded one in the event of a fault.

According to an embodiment, all the control units are operatively connected to each other so that each knows the type of operation, standard or fault, implemented by each of the other control units.

According to an embodiment, each electromechanical or electro-hydraulic actuator is equipped with an operating sensor suitable to monitor the operating condition of the relative electromechanical or electro-hydraulic actuator and/or of the relative braking device and to send the corresponding control unit an indication of standard or fault operation.

According to an embodiment, the electromechanical actuators comprise a three-phase motor, each three-phase motor being operatively connected to the respective control device and to the respective power source of the corresponding brake group.

According to an embodiment, the control units are programmed so that in case of fault of a brake group, the actuation of the remaining brake groups is ensured so that:
if the fault relates to a rear brake group, the two front brake groups are actuated and, progressively, the remaining rear brake group so as to allow the dynamic control of the vehicle,
if the fault relates to a front brake group, the other front brake group is actuated and the corresponding crossover rear brake group, i.e. arranged on the opposite side to the functioning front brake group and, progressively, the remaining rear brake group, on the same side as the functioning front brake group.

According to an embodiment, the control units are programmed so that in case of fault of a brake group, the actuation of the remaining three brake groups is ensured,
wherein the braking system is operatively connected to a steering mechanism of the vehicle, so as to coordinate the operation of steering mechanism with the actuation of the functioning brake groups.

According to an embodiment, the control units are programmed so that in case of fault of a brake group, the actuation of the remaining three brake groups is ensured,
wherein the braking system is operatively connected to electrical power generation means operatively connected to the brake groups so as to obtain an additional braking action of the vehicle.

According to an embodiment, each control unit of a brake group of an axle is operatively connected to both a primary control device connected to the brake group thereof and to a secondary control device connected to the other brake group of the same axle, so that, in the case of standard operation, each braking device is actuated by its own primary control device and, in case of electric fault of a brake group, the braking device of the brake group in fault is actuated by the secondary control device controlled by the other control unit of the axle.

According to a possible embodiment, each control unit of a brake group of a front or rear axle is operatively connected both to a primary piloting device and to a secondary piloting device, wherein each of said primary and secondary piloting devices is operatively connected to the brake groups of the same axle, so that, in the case of standard operation, each braking device is actuated by at least one or both of said primary and secondary piloting devices and, in the event of an electrical fault, the braking device of the faulted brake group is actuated by the other piloting device.

According to an embodiment, said axle is the front axle or rear axle of the vehicle.

According to an embodiment, all the control units are operatively connected to each other so that each knows the type of operation, standard or fault, implemented by each of the other control units.

According to an embodiment, each electromechanical actuator is equipped with two operating sensors, each suitable to monitor the operating condition of the relative electromechanical actuator and/or of the relative braking device and to send an indication of standard or fault operation to both the control units of the same axle.

According to an embodiment, the electromechanical actuators comprise a six-phase motor, each six-phase motor being operatively connected to the primary control device of its own brake group and to the secondary control device the other brake group of the same axle.

According to an embodiment, the system is equipped with a manually operated device, a lever, foot pedal and/or push button, equipped with at least a relative actuation sensor so as to be able to send each control unit a braking request from a user.

According to an embodiment, the system is managed by a control unit of the vehicle which manages vehicle dynamics and is able to perform guidance and an independent braking action of the same.

DESCRIPTION OF THE DRAWINGS

Further features and advantages of the present invention will appear more clearly from the following description of preferred non-limiting embodiments thereof, in which.

Elements or parts of elements in common to the embodiments described below are referred to with the same reference numerals.

DETAILED DESCRIPTION

With reference to the above figures, reference numeral 4 globally denotes a braking system for vehicles.

For the purposes of the present invention, vehicles means motor vehicles equipped with at least four wheels.

In particular, the braking system for vehicles 4 comprises a right front brake group 8d and a left front brake group 8s intended for the front axle 12 of a vehicle, right rear brake group 16d and a left rear brake group 16s intended for a rear axle 20 of a vehicle.

Each brake group 8d, 8s, 16d, 16s comprises a brake disc 24, a braking device 28 associated with said brake disc 24, electromechanical actuator means 32 of each braking device 28.

It should be noted that, for the purposes of the present invention, the braking device 28 may be of various types, preferably comprising a disk brake; however, drum or roller brakes are also included among the applications of the present invention.

The electromechanical actuator means 32 may comprise electric motors configured in such a way as to enable and disable the braking devices. For example, said electromechanical actuator means 32 may comprise an electric motor connected, by means of a worm screw mechanism, to a pusher for at least one piston acting on a pad of a disk brake caliper.

Each brake group 8d, 8s, 16d, 16s further comprises a control unit 36 operatively connected to the electromechanical actuators 32 of each brake group 8d, 8s, 16d, 16s through a relative piloting device 40.

Such a connection may for example take place via an electric line.

The electromechanical actuator means 32 may comprise a three-phase motor 34; each three-phase motor 34 is operatively connected to the respective piloting device 40 and to a power supply device 42 connected to at least two separate power sources 44.

Preferably, each power source is galvanically isolated from the other power sources 44.

The power source 44 is typically a lead battery, a lithium ion battery and the like.

Advantageously, each control unit 36 is programmed to implement, via said piloting device 40, a standard braking strategy in case of a standard operation for each brake group 8d, 8s, 16d, 16s and a fault braking strategy, if it detects an electrical fault of one or more of the brake groups 8d, 8s, 16d, 16s.

Standard operation means a normal operating condition in which there are no anomalies in the braking system that is able to exert the braking action requested by the user or by the autonomous driving system of the vehicle (if provided).

Electric fault condition means a malfunction of a brake group 8d, 8s, 16d, 16s, for example of the supply devices 42, of the piloting devices 40, of the power supply sources 44, of the electromechanical actuator means 32, 34, 35 that partially or totally prevents the operation thereof.

'Fault' means a generic condition of malfunction which may include a problem both to the mechanical components (braking devices 28 and/or electromechanical actuator means 32) and to the electrical/electronic components, but may also comprise a software problem of management of the control unit, reading of the data concerning the operation of the system and the like.

According to a possible embodiment (FIG. 4), each piloting device 40 is programmed to switch from a first switch condition, corresponding to the standard braking strategy, to a second switch position corresponding to the fault-braking strategy.

The standard braking strategy implements the actuation of each brake group 8d, 8s, 16d, 16s according to the standard operating parameters of the system, while the fault strategy can result in a reduced or emergency actuation of a brake group of the system compared to the standard strategy, as better described below.

It is also possible to contemplate the contribution of external systems, such as regenerative or steering braking systems, which compensate for any anomalies in terms of performance and vehicle stability, in fault conditions.

The control units 36 of all the brake groups 8d, 8s, 16d, 16s are operatively connected to each other so that each knows the type of operation, standard or fault, implemented by each of the other control units 36.

Such a connection may for example take place via an electric line and/or a data transmission line 33, for example of the CAN type. In this way, the control units, having detected a fault condition, can manage the vehicle braking by implementing the fault strategy.

To this end, according to a possible embodiment, each electromechanical means 32 is equipped with at least one operating sensor 52 suitable to monitor the operating condition of the relative electromechanical or actuator means 32 and/or of the relative braking device 28 and to send the corresponding control unit 36 an indication of standard or fault operation. This information is then sent to the other control units 36.

As mentioned, the control units 36 are programmed so that in case of fault of a brake group, the actuation of the remaining brake groups is ensured.

In particular, if the fault relates to a rear brake group 16d, 16s, the two front brake groups 8d, 8s are actuated and, progressively, the remaining rear brake group 16s, 16d so as to allow the dynamic control of the vehicle.

In other words, the overall operation of three brake groups is guaranteed, giving priority to the two front brake groups 8d, 8s which ensure most of the braking action, guaranteeing better stability of the vehicle and allowing, progressively, even the braking of the third rear brake group 16d, 16s so that this does not compromise the stability of the vehicle. Obviously, the remaining faulted brake group remains deactivated.

If the fault relates to a front brake group 8d, 8s, the other non-faulted front brake group 8s, 8d is actuated and the corresponding crossover rear brake group 16d, 16s, i.e. arranged on the opposite side to the functioning front brake group 8s, 8d and, progressively, the remaining rear brake group 16s, 16d, on the same side as the functioning front brake group 8s, 8d.

The initially simultaneous and crossed operation between a front brake group 8d, 8s and a rear brake group 16s, 16d serves to ensure the dynamic stability of the vehicle, especially in yaw, avoiding operating only the braking devices 28 arranged on the same side (right or left) of the vehicle.

The addition of the third braking device 28 also serves to increase the overall braking action of the system 4, thus limiting the malfunction to a single brake group 8d, 8s, 16d, 16s.

It is also possible to provide that in the event of a fault in a brake group 8d, 8s, 16d, 16s, the operation of the remaining three brake groups is guaranteed, and that the braking system is operatively connected to a steering mechanism of the vehicle, so as to coordinate the operation of steering mechanism with the actuation of the functioning brake groups. In other words, a possible instability of the vehicle is corrected either by acting on three wheel groups or by acting automatically on the vehicle steering.

It is also possible to provide that the control units 36 are programmed so that in the event of a fault of the remaining three brake groups is guaranteed, wherein the braking system is operatively connected to electrical power generation means operatively connected to the brake groups 8d, 8s, 16d, 16s so as to obtain an additional braking action of the vehicle. Furthermore, due to regenerative braking, it is possible to obtain a further braking effect which can compensate for malfunctions of the wheel groups.

According to a further embodiment (FIG. 4), each control unit 36', 36" of a brake group 8d, 8s, 16d, 16s of a front or rear axle 12, 20 is operatively connected both to a primary piloting device 40' and to a secondary piloting device 40" connected to the other brake group 8s, 8d, 16s, 16d of the same axle 12, 20.

Figure 4:
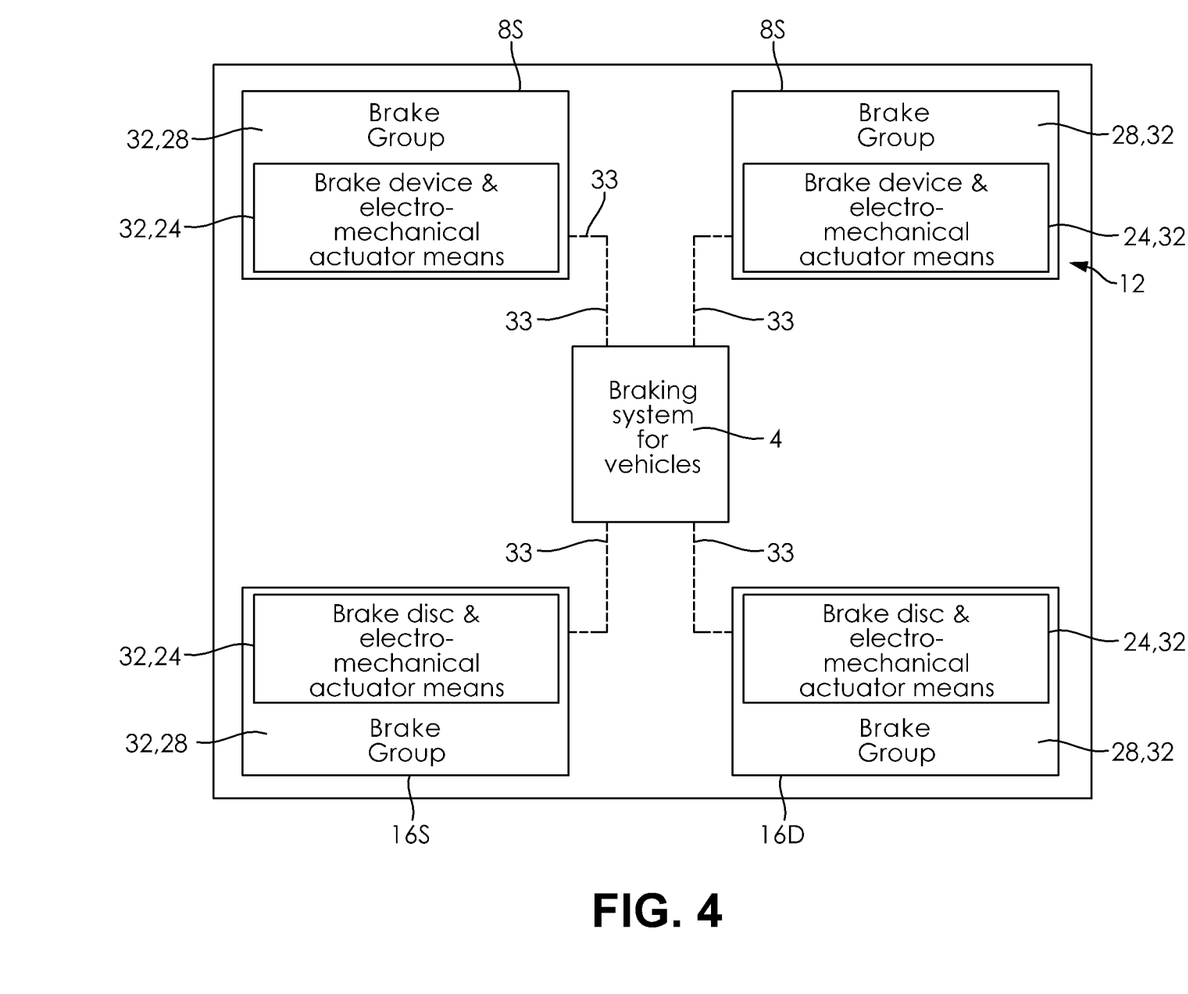
FIG. 4 shows a schematic view of a vehicle comprising a braking system according to the present invention.

Such a connection may for example take place via an electric line and/or a data transmission line 33.

In this way, in the case of standard operation, each braking device 28 is actuated by its primary piloting device 40' whereas, in the event of an electrical fault of a brake group 8d, 8s, 16d, 16s in fault, the braking device 28 of the braking device 8d, 8s, 16d, 16s in fault is actuated by the secondary piloting device 40" controlled by the other control unit 36", 36' of the same axle 12, 20.

The above applies to both the front axle 12 and the rear axle 20 of the vehicle.

According to a further embodiment, each control unit 36', 36" of a brake group 8d, 8s, 16d, 16s of a front or rear axle 12, 20 is operatively connected both to a primary piloting device 40' and to a secondary piloting device 40", wherein each of said primary and secondary piloting devices 40', 40') is operatively connected to the brake groups 8d, 8s, 16d, 16s of the same axle 12, 20. In this way, in case of standard operation, each braking device 28 is actuated by at least one or both of said primary and secondary piloting devices 40', 40" and, in case of electric fault of one of said devices, the braking device 28 of the brake group 8d, 8s, 16d, 16s in fault is actuated by the other functioning piloting device 40", 40'.

Preferably, all the control units 36 of the two front and rear axle 12, 20 are operatively connected to each other so that each knows the type of operation, standard or fault, implemented by each of the other control units.

Such a connection may for example take place via an electric line and/or a data transmission line 33, for example of the CAN type.

Each electromechanical actuator means 32 is provided with at least one operating sensor and preferably two operating sensors 52', 52", each suitable to monitor the operating condition of the relative electromechanical actuator 32 and/or of the relative braking device 28 and to send an indication of standard or fault operation to both the control units of the same axle 12, 20.

Preferably, the electromechanical actuator means 32 comprise a six-phase motor 35.

Each six-phase motor 35 is operatively connected to the primary piloting device 40' of its own brake group 8d, 8s, 16d, 16s and to the secondary piloting device 40" of the other brake group 8s, 8d, 16s, 16d of the same axle 12, 20.

Such a connection may for example take place via an electric line and/or a data transmission line 33.

The use of a six-phase motor 35 easily allows connecting the same electromechanical actuator means 32 to separate primary and secondary piloting devices 40', 40" which can instantaneously guarantee the operation of each brake group 8d, 8s, 16d, 16s.

In this way, the braking system can always count on the simultaneous braking of all the brake groups 8d, 8s, 16d, 16s even in case of electrical fault of one of them.

The braking systems 4 of the present invention may be equipped with a manually operated device 56, a lever, foot pedal and/or push button, equipped with at least a relative actuation sensor 60 so as to be able to send each control unit 36 a braking request from a user.

Preferably, there are provided 3 driving sensors 60', 60", 60''' connected to the same manually operated device 56. In this way, the signal is picked up and sent when the reading of at least two of the three sensors coincides.

It is also possible to provide that the braking system 4 is managed by a control unit of the vehicle which manages vehicle dynamics and is able to perform guidance and an independent braking action of the same.

As can be appreciated from the foregoing, the braking system for vehicles according to the invention overcomes the drawbacks of the prior art.

In fact, the braking system allows completely eliminating the part of hydraulic backup and in general of backup that requires the manual intervention of the operator typical of traditional braking systems without losing in reliability or safety, even in case of fault.

The elimination of the backup part of the system allows reducing overall the system masses, the hydraulic lines and all the sealing problems connected to them. Furthermore, it is not necessary to periodically replace the braking fluid, due to its strong hygroscopicity.

Furthermore, the system of the present invention lends itself well to being integrated into a self-driving full-electric vehicle, in which the braking action can be controlled autonomously by a control unit which is responsible for driving and controlling the vehicle.

Furthermore, the system of the present invention also lends itself well to non-autonomous driving solutions in which the user manually requests the braking action.

Furthermore, the braking system guarantees the safety of the braking even in the event of an electrical fault.

Figure 1:
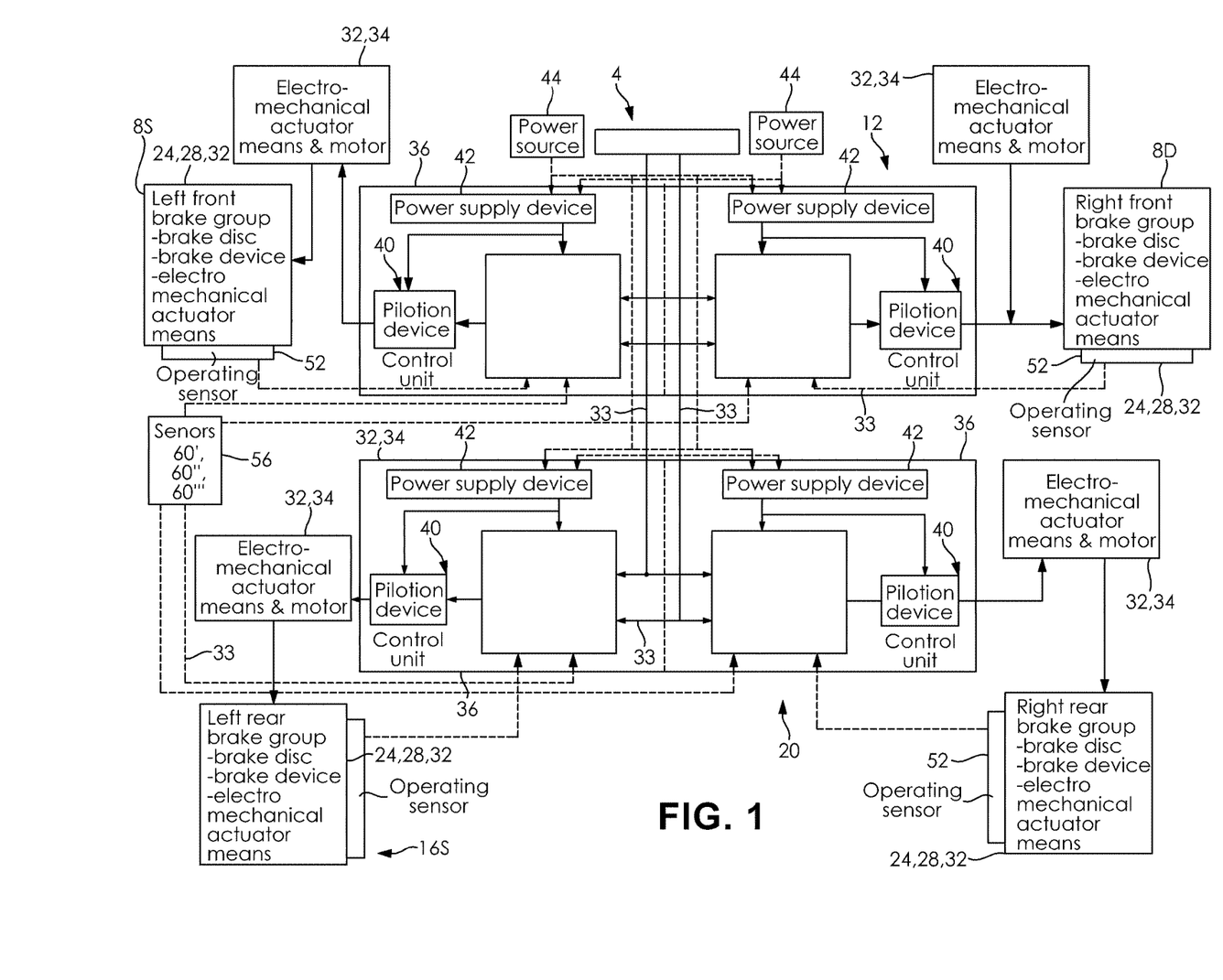
FIG. 1 show schematic views of a braking system for vehicles according to first embodiment of the present invention.

In fact, in the case of the embodiment in FIG. 1, the braking action of at least three brake groups and therefore at least three wheels is always guaranteed. As seen, on the basis of the fault location with respect to the vehicle, two wheels always brake and the third brakes gradually, so as not to compromise the stability of the vehicle.

Moreover, as seen, it is possible to compensate for malfunctions of a wheel group either by acting on vehicle steering control systems or by acting on regenerative braking devices.

In the first case, a vehicle check is carried out, for example to correct yawing phenomena, in the second case an additional braking action is obtained to reduce the speed thereof. Obviously, the two actions may be combined with each other.

Figure 2:
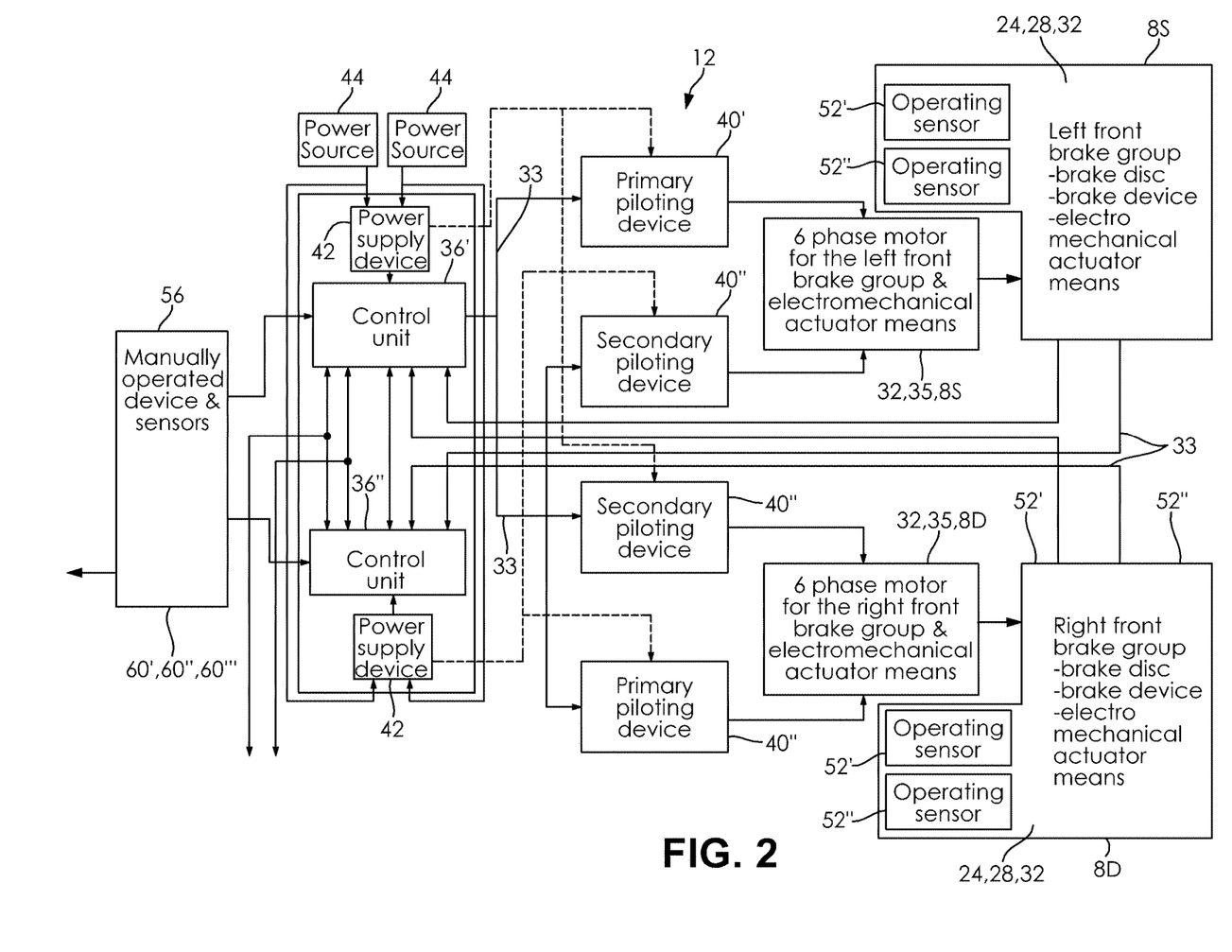
FIGS. 2-3 show schematic views of a front axle and a rear axle of a vehicle equipped with a braking system according to a further embodiment of the present invention, respectively.
Figure 3:
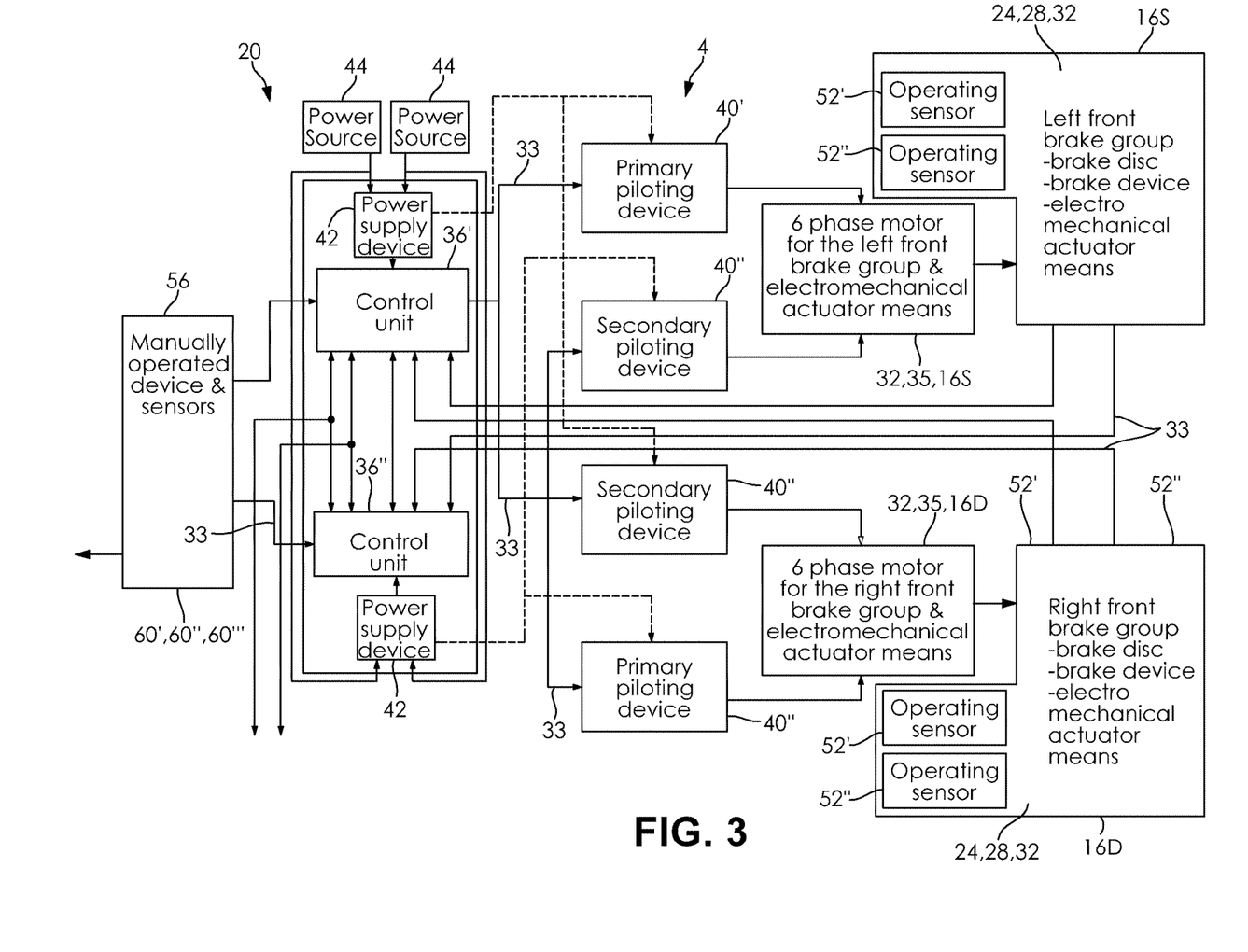

Indeed, in the case of the embodiment in FIG. 2, all four vehicle wheels may brake, always ensuring the effectiveness of braking and the stability of the vehicle that is not affected.

Therefore, the system of the present invention has the same level of reliability and safety of a traditional hydraulic braking system, without the drawbacks of hydraulic backups and without the need for manual backup by an operator, with the advantage that it can also be used on a self-driving vehicle.

A man skilled in the art, in order to meet contingent and specific requirements, may make several modifications and variants to the brake systems for vehicles described above, all of which fall within the scope of the invention as defined by the following claims.

The invention claimed is:

1. A braking system for a vehicle, comprising:
a right front brake group and a left front brake group intended for a front axle of the vehicle, a right rear brake group and a left rear brake group intended for a rear axle of the vehicle,
each brake group comprising a brake disc, a braking device associated with said brake disc, and electrohydraulic or electromechanical actuator devices for each braking device,
a control unit for each brake group, operatively connected to the electromechanical actuators of each brake group through at least one respective piloting device,
each control unit being powered by one of two independent power sources, wherein the independent power sources are galvanically isolated from one another,
each control unit being programmed to implement, via said piloting device, a standard braking strategy in case of standard operation for each brake group and a fault braking strategy, if it detects an electrical fault of one or more of the brake groups;
wherein the control units are programmed so that in case of fault of one of the brake groups, the actuation of the three remaining brake groups is ensured,
wherein the braking system is adapted to coordinate control of a vehicle steering mechanism with the actuation of the functioning brake groups,
wherein each control unit at each brake group of the front and rear axle is operatively connected to said at least one respective piloting device located at each brake group, wherein said at least one respective piloting device comprises both a primary piloting device and a secondary piloting device at each brake group, wherein each of said primary and secondary piloting devices is operatively connected to the brake groups of the same axle,
so that, in case of standard operation, each braking device is actuated by at least one or both of said primary and secondary piloting devices and, in case of electric fault of one of said devices, the braking device of the brake group in fault is actuated by the other piloting device.

2. The braking system for the vehicle according to claim 1, wherein each of the pilot devices are programmed to transition from a first position, corresponding to the standard braking strategy, to a second position corresponding to the fault-braking strategy.

3. The braking system for the vehicle according to claim 1, wherein all the control units are operatively connected to each other so that each knows the type of operation, standard or fault, implemented by each of the other control units.

4. The braking system for the vehicle according to claim 1, wherein each electromechanical actuator is equipped with an operating sensor suitable to monitor the operating condition of the respective electromechanical or electro-hydraulic actuator and/or of the respective braking device and to send the corresponding control unit an indication of standard or fault operation.

5. The braking system for the vehicle according to claim 1, wherein some electromechanical actuators comprise a three-phase motor, each three-phase motor being operatively connected to the respective piloting device and to the respective power source of the corresponding brake group.

6. The braking system for the vehicle according to claim 1, wherein the control units are programmed so that in case of fault of one of the brake groups, the actuation of the remaining brake groups is ensured so that:

if the fault relates to one of the rear brake groups, the two front brake groups are actuated and, progressively, the remaining rear brake group so as to allow dynamic control of the vehicle, if the fault relates to one of the front brake groups, the other front brake group is actuated and the corresponding crossover rear brake group i.e. arranged on the opposite side to the functioning front brake group and, progressively, the remaining rear brake group, on the same side as the functioning front brake group.

7. The braking system for the vehicle according to claim 1, wherein the control units are programmed so that in case of fault of one of the brake groups, the actuation of the three remaining brake groups is ensured, wherein the braking system is operatively connected to electrical power generation means operatively connected to the brake groups so as to obtain an additional braking action of the vehicle.

8. The braking system for the vehicle according to claim 1, wherein all the control units are operatively connected to each other so that each knows the type of operation, standard or fault, implemented by each of the other control units.

9. The braking system for the vehicle according to claim 1, wherein each electromechanical actuator is equipped with two operating sensors each suitable to monitor the operating condition of the respective electromechanical actuator and/or of the respective braking device and to send an indication of standard or fault operation to both the control units.

10. The braking system for the vehicle according to claim 1, where the electromechanical actuators comprise a six-phase motor, each six-phase motor being operatively connected to the primary piloting device of the brake group of the six-phase motor and the primary piloting device, and to the control unit of the other brake group.

11. The braking system for the vehicle according to claim 1, further comprising a manually operated device, a lever, foot pedal and/or push button, equipped with a respective actuation sensor so as to be able to send each control unit a braking request from a user.

12. The braking system for the vehicle according to claim 1, wherein a control unit of the vehicle manages vehicle dynamics and is able to perform guidance and an independent braking action of the same.

* * * * *